(12) United States Patent
Fang

(10) Patent No.: US 11,694,422 B2
(45) Date of Patent: Jul. 4, 2023

(54) METHOD TO IMPROVE ACCURACY OF QUANTIZED MULTI-STAGE OBJECT DETECTION NETWORK

(71) Applicant: Ambarella International LP, Santa Clara, CA (US)

(72) Inventor: Zhao-Qi Fang, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 275 days.

(21) Appl. No.: 17/096,110

(22) Filed: Nov. 12, 2020

(65) Prior Publication Data

US 2022/0147753 A1 May 12, 2022

(51) Int. Cl.
| | | |
|---|---|---|
| G06V 10/28 | (2022.01) | |
| G06T 3/00 | (2006.01) | |
| G06T 3/40 | (2006.01) | |
| G06V 10/25 | (2022.01) | |
| G06V 10/44 | (2022.01) | |
| G06N 7/01 | (2023.01) | |

(52) U.S. Cl.
CPC ............. *G06V 10/28* (2022.01); *G06N 7/01* (2023.01); *G06T 3/0093* (2013.01); *G06T 3/4007* (2013.01); *G06V 10/25* (2022.01); *G06V 10/443* (2022.01)

(58) Field of Classification Search
CPC ...... G06V 10/28; G06V 10/25; G06V 10/443; G06N 7/005; G06T 3/0093; G06T 3/4007
USPC .................................................. 382/173, 251
See application file for complete search history.

(56) References Cited

U.S. PATENT DOCUMENTS

| | | | | |
|---|---|---|---|---|
| 10,713,794 | B1* | 7/2020 | He | G06V 10/764 |
| 2019/0147245 | A1* | 5/2019 | Qi | G06V 10/82 |
| | | | | 382/103 |
| 2021/0133474 | A1* | 5/2021 | Sawada | G06V 10/811 |

* cited by examiner

*Primary Examiner* — Ayodeji O Ayotunde
(74) *Attorney, Agent, or Firm* — Christopher P. Maiorana, PC

(57) ABSTRACT

An apparatus includes a memory and a processor. The memory may be configured to store image data of an input image. The processor may be configured to detect one or more objects in the input image using a quantized multi-stage object detection network, where quantization of the quantized multi-stage object detection network includes (i) generating quantized image data by performing a first data range analysis on the image data of the input image, (ii) generating a feature map and proposal bounding boxes by applying a region proposal network (RPN) to the quantized image data, (iii) performing a region of interest pooling operation on the feature map and a plurality of ground truth boxes corresponding to the proposal bounding boxes generated by the RPN, (iv) generating quantized region of interest pooling results by performing a second data range analysis on results from the region of interest pooling operation, and (v) applying a region-based convolutional neural network (RCNN) to the quantized region of interest pooling results.

20 Claims, 8 Drawing Sheets

METHOD TO IMPROVE ACCURACY OF QUANTIZED MULTI-STAGE OBJECT DETECTION NETWORK

This application relates to Chinese Application No. 202011228919.8, filed Nov. 6, 2020, which is incorporated by reference in its entirety.

FIELD OF THE INVENTION

The invention relates to computer vision generally and, more particularly, to a method and/or apparatus for improved accuracy of a quantized multi-stage object detection network.

BACKGROUND

In order to minimize an accuracy drop after quantization towards a quantized neural network model, quantization methods analyze a data range of input data. The accuracy of the quantized model is very sensitive to data of the data range analysis, especially the input data.

State of the art object detection networks rely on region proposal algorithms to hypothesize object locations. An existing region-based object detection network is Faster-RCNN. Faster-RCNN is composed of a region proposal network (RPN) and a region-based convolutional neural network (RCNN). Between the RPN and the RCNN, Faster-RCNN functions such as bbox_transform_inv, non-maximum suppression (NMS), and ROI-Pooling are performed. The RPN uses default anchors to get proposal bounding boxes that may contain the objects while performing feature extraction on the image. Then, the proposal bounding boxes go through the bbox transform, NMS, and ROI-Pooling, finally entering the RCNN. Since the middle steps are not very friendly to artificial intelligence (AI) chips, the industry practice is to split the network in two parts, the RPN and the RCNN. Because the network is in two parts, the data range analysis (DRA) needs to be done twice. The first data range analysis is performed on the images presented as input to the RPN. For multi-stage object detection, the industry practice is to perform the second data range analysis on the output of the ROI-Pooling. The data presented by the ROI Pooling is determined by proposal bounding boxes generated by the RPN, which is presented as input to the RCNN. While the data from the ROI Pooling is the same as the inference, it is not very suitable for the quantization.

It would be desirable to implement a method to improve accuracy of a quantized multi-stage object detection network.

SUMMARY

The invention encompasses an aspect concerning an apparatus comprising a memory and a processor. The memory may be configured to store image data of an input image. The processor may be configured to detect one or more objects in the input image using a quantized multi-stage object detection network, where quantization of the quantized multi-stage object detection network includes (i) generating quantized image data by performing a first data range analysis on the image data of the input image, (ii) generating a feature map and proposal bounding boxes by applying a region proposal network (RPN) to the quantized image data, (iii) performing a region of interest pooling operation on the feature map and a plurality of ground truth boxes corresponding to the proposal bounding boxes generated by the RPN, (iv) generating quantized region of interest pooling results by performing a second data range analysis on results from the region of interest pooling operation, and (v) applying a region-based convolutional neural network (RCNN) to the quantized region of interest pooling results.

In some embodiments of the apparatus aspect described above, the ground truth boxes are projections of the proposal bounding boxes on the input image.

In some embodiments of the apparatus aspect described above, the second data range analysis applies a technique applied by the first data range analysis.

In some embodiments of the apparatus aspect described above, training of the RPN and the RCNN comprises (i) generating a feature map and proposal bounding boxes by applying the RPN to the image data of the input image and (ii) performing the region of interest pooling operation on the feature map and the proposal bounding boxes generated by the RPN.

In some embodiments of the apparatus aspect described above, the RPN and the RCNN are stored in the processor as directed acyclic graphs and corresponding weights.

In some embodiments of the apparatus aspect described above, the RPN and the RCNN share one or more convolution layers.

In some embodiments of the apparatus aspect described above, the processor is further configured to generate a pooling result for a region of interest by cropping and resampling a corresponding portion of a feature map to which an object detection proposal is assigned. In some embodiments, the resampling comprises a warping operation. In some embodiments, the processor may configure bilinear interpolation hardware to resize features of the region of interest for use as an input to subsequent sub-networks on hardware.

In some embodiments of the apparatus aspect described above, the feature map comprises a three-dimensional array having dimensions corresponding to a depth, a height, and a width of said feature map.

In some embodiments of the apparatus aspect described above, the memory and the processor are part of at least one of a computer vision system or an autonomous vehicle.

The invention also encompasses an aspect concerning a method of object detection comprising storing image data of an input image in a memory and detecting one or more objects in the input image using a quantized multi-stage object detection network, where quantization of the quantized multi-stage object detection network is performed by (i) generating quantized image data by performing a first data range analysis on the image data of the input image, (ii) generating a feature map and proposal bounding boxes by applying a region proposal network (RPN) to the quantized image data, (iii) performing a region of interest pooling operation on the feature map and a plurality of ground truth boxes corresponding to the proposal bounding boxes generated by the RPN, (iv) generating quantized region of interest pooling results by performing a second data range analysis on results from the region of interest pooling operation, and (v) applying a region-based convolutional neural network (RCNN) to the quantized region of interest pooling results.

In some embodiments of the method aspect described above, the ground truth boxes are projections of the proposal bounding boxes on said input image.

In some embodiments of the method aspect described above, the method further comprises training the RPN and the RCNN, wherein training of the RPN and the RCNN comprises (i) generating a feature map and proposal bounding boxes by applying the RPN to the image data of the input image and (ii) performing the region of interest pooling operation on the feature map and the proposal bounding boxes generated by the RPN.

In some embodiments of the method aspect described above, the RPN and the RCNN are stored in the processor as directed acyclic graphs and corresponding weights.

In some embodiments of the method aspect described above, the RPN and the RCNN share one or more convolution layers.

In some embodiments of the method aspect described above, the method further comprises generating a pooling result for a region of interest by using the processor to perform cropping and resampling of a corresponding portion of a feature map to which an object detection proposal is assigned. In some embodiments, resampling comprises applying a warping operation.

In some embodiments of the method aspect described above, the method further comprises using the processor to configure bilinear interpolation hardware to resize features of the region of interest for use as an input to subsequent sub-networks on hardware.

In some embodiments of the method aspect described above, the feature map comprises a three-dimensional array having dimensions corresponding to a depth, a height, and a width of said feature map.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include a method of improving accuracy of a quantized multi-stage object detection network that may (i) directly use ground truth to perform second stage data range analysis (DRA) during quantization, (ii) reduce or eliminate effect of too many non-object proposal bounding boxes on results of the second stage data range analysis, (iii) provide a second stage data range analysis that is independent of the first stage, (iv) obtain best distribution of data range analysis data, (v) obtain relatively high accuracy, (vi) be used in all networks containing a region proposal network (RPN), (vii) be used in cascade networks (e.g., Faster-RCNN, MASK-RCNN, Cascade-RCNN, MTCNN, etc.), (viii) construct a convolutional feature map, (ix) assign proposals/ROIs to ground truth bounding boxes in input image, (x) be implemented on embedded devices having limited hardware resources and power budgets, (xi) be implemented with a vector processor, CPU, DSP, or GPU, and/or (xii) be implemented as one or more integrated circuits.

Figure 1:
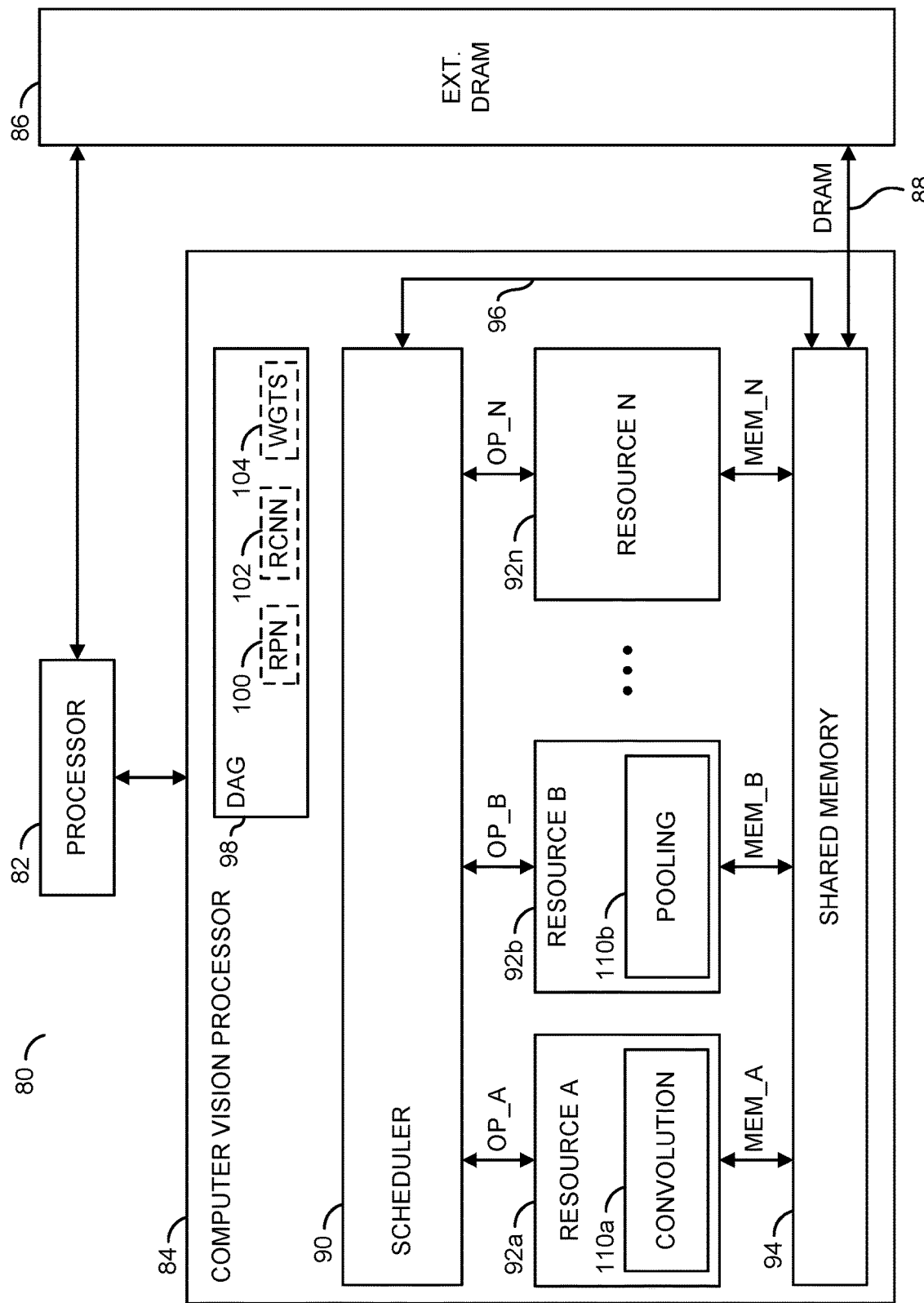
FIG. 1 is a diagram illustrating a context in which a quantized multi-stage object detection network in accordance with an example embodiment of the invention may be implemented.

Referring to FIG. 1, a diagram of a processing circuit 80 is shown illustrating a context in which a detection process incorporating a region of interest (ROI) pooling approach in accordance with an example embodiment of the invention may be implemented. In various embodiments, the processing circuit 80 may be implemented as part of a computer vision system. In various embodiments, the processing circuit 80 may be implemented as part of a camera, a computer, a server (e.g., a cloud server), a smart phone (e.g., a cellular telephone), a personal digital assistant, or the like. In an example, the processing circuit 80 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuit 80 generally comprises hardware circuitry that is optimized to provide a high performance image processing and computer vision pipeline in minimal area and with minimal power consumption. In an example, various operations used to perform image processing, feature detection/extraction, and/or object detection/classification for computer (or machine) vision may be implemented using hardware modules designed to reduce computational complexity and use resources efficiently.

In an example embodiment, the processing circuit 80 may comprise a block (or circuit) 82, a block (or circuit) 84, a block (or circuit) 86, and/or a memory bus 88. The circuit 82 may implement a first processor. The circuit 84 may implement a second processor. In an example, the circuit 84 may implement a computer vision processor. In an example, the processor 84 may be an intelligent vision processor. The circuit 86 may implement an external memory (e.g., a memory external to the circuits 82 and 84). In an example, the circuit 86 may be implemented as a dynamic random access memory (DRAM) circuit. The processing circuit 80 may comprise other components (not shown). The number, type and/or arrangement of the components of the processing circuit 80 may be varied according to the design criteria of a particular implementation.

The circuit 82 may implement a processor circuit. In some embodiments, the processor circuit 82 may be implemented using a general purpose processor circuit. The processor 82 may be operational to interact with the circuit 84 and the circuit 86 to perform various processing tasks. In an example, the processor 82 may be configured as a controller for the circuit 84. The processor 82 may be configured to execute computer readable instructions. In one example, the computer readable instructions may be stored by the circuit 86. In some embodiments, the computer readable instructions may comprise controller operations. The processor 82 may be configured to communicate with the circuit 84 and/or access results generated by components of the circuit 84. In an example, the processor 82 may be configured to utilize the circuit 84 to perform operations associated with one or more neural network models.

In an example, the processor 82 may be configured to program the circuit 84 with one or more pre-trained artificial neural network models (ANNs) including a region proposal network (RPN) 100, a region-based convolutional neural network (RCNN) 102, and corresponding weights/kernels (WGTS) 104 related to the RPN 100 and the RCNN 102. In various embodiments, the RPN 100 and the RCNN 102 may be configured (trained and/or quantized) for operation in an edge device. In an example, the processing circuit 80 may be coupled to a sensor (e.g., video camera, etc.) configured to generate a data input. The processing circuit 80 may be configured to generate one or more outputs in response to the data input from the sensor based on one or more inferences made by executing the RPN 100 and the RCNN 102 with the corresponding weights/kernels (WGTS) 104. The operations performed by the processor 82 may be varied according to the design criteria of a particular implementation.

In various embodiments, the circuit 86 may implement a dynamic random access memory (DRAM) circuit. The circuit 86 is generally operational to store multidimensional arrays of input data elements and various forms of output data elements. The circuit 86 may exchange the input data elements and the output data elements with the processor 82 and the processor 84.

The processor 84 may implement a computer vision processor circuit. In an example, the processor 84 may be configured to implement various functionality used for computer vision. The processor 84 is generally operational to perform specific processing tasks as arranged by the processor 82. In various embodiments, all or portions of the processor 84 may be implemented solely in hardware. The processor 84 may directly execute a data flow directed to object detection with region of interest pooling, and generated by software (e.g., a directed acyclic graph, etc.) that specifies processing (e.g., computer vision) tasks. In some embodiments, the processor 84 may be a representative example of numerous computer vision processors implemented by the processing circuit 80 and configured to operate together.

In an example embodiment, the processor 84 generally comprises a block (or circuit) 90, one or more blocks (or circuits) 92a-92n, a block (or circuit) 90, a path 96, and a block (or circuit) 98. The block 90 may implement a scheduler circuit. The blocks 92a-92n may implement hardware resources (or engines). The block 94 may implement a shared memory circuit. The block 98 may implement a directed acyclic graph (DAG) memory. In an example embodiment, one or more of the circuits 92a-92n may comprise blocks (or circuits) 110a-110n. In the example shown, circuits 110a and 110b are implemented.

In an example embodiment, the circuit 110a may implement convolution operations. In another example, the circuit 110b may be configured to provide pooling operations. The circuit 110b may be configured to provide ROI pooling operations in accordance with an example embodiment of the invention (e.g., using ground truth inputs as part of a quantization process). The convolution and pooling operations may be used to perform computer (or machine) vision tasks (e.g., as part of an object detection process, etc.). In yet another example, one or more of the circuits 92c-92n may comprise blocks (or circuits) 110c-110n (not shown) to provide convolution calculations in multiple dimensions.

In an example, the circuit 84 may be configured to receive directed acyclic graphs (DAGs) from the processor 82. The DAGs received from the processor 82 may be stored in the DAG memory 98. The circuit 84 may be configured to execute DAGs for the RPN 100 and RCNN 102 using the circuits 90, 92a-92n, and 94.

Multiple signals (e.g., OP_A to OP_N) may be exchanged between the circuit 90 and the respective circuits 92a-92n. Each signal OP_A to OP_N may convey execution operation information and/or yield operation information. Multiple signals (e.g., MEM_A to MEM_N) may be exchanged between the respective circuits 92a-92n and the circuit 94. The signals MEM_A to MEM_N may carry data. A signal (e.g., DRAM) may be exchanged between the circuit 86 and the circuit 94. The signal DRAM may transfer data between the circuits 86 and 90 (e.g., on the memory bus 96).

The circuit 90 may implement a scheduler circuit. The scheduler circuit 90 is generally operational to schedule tasks among the circuits 92a-92n to perform a variety of computer vision related tasks as defined by the processor 82. Individual tasks may be allocated by the scheduler circuit 90 to the circuits 92a-92n. The scheduler circuit 90 may allocate the individual tasks in response to parsing the directed acyclic graphs (DAGs) provided by the processor 82. The scheduler circuit 90 may time multiplex the tasks to the circuits 92a-92n based on the availability of the circuits 92a-92n to perform the work.

Each circuit 92a-92n may implement a processing resource (or hardware engine). The hardware engines 92a-92n are generally operational to perform specific processing tasks. The hardware engines 92a-92n may be implemented to include dedicated hardware circuits that are optimized for high-performance and low power consumption while performing the specific processing tasks. In some configurations, the hardware engines 92a-92n may operate in parallel and independent of each other. In other configurations, the hardware engines 92a-92n may operate collectively among each other to perform allocated tasks.

The hardware engines 92a-92n may be homogenous processing resources (e.g., all circuits 92a-92n may have the same capabilities) or heterogeneous processing resources (e.g., two or more circuits 92a-92n may have different capabilities). The hardware engines 92a-92n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator, and a power of two downsample operator, etc.

In various embodiments, the hardware engines 92a-92n may be implemented solely as hardware circuits. In some embodiments, the hardware engines 92a-92n may be implemented as generic engines that may be configured through circuit customization and/or software/firmware to operate as special purpose machines (or engines). In some embodiments, the hardware engines 92a-92n may instead be implemented as one or more instances or threads of program code executed on the processor 82 and/or one or more processors 84, including, but not limited to, a vector processor, a central processing unit (CPU), a digital signal processor (DSP), or a graphics processing unit (GPU). In some embodiments, one or more of the hardware engines 92a-92n may be selected for a particular process and/or thread by the scheduler 90. The scheduler 90 may be configured to assign the hardware engines 92a-92n to particular tasks in response to parsing the directed acyclic graphs stored in the DAG memory 98.

The circuit 94 may implement a shared memory circuit. The shared memory 94 may be configured to store data in response to input requests and/or present data in response to output requests (e.g., requests from the processor 82, the DRAM 86, the scheduler circuit 90 and/or the hardware engines 92a-92n). In an example, the shared memory circuit 94 may implement an on-chip memory for the computer vision processor 84. The shared memory 94 is generally operational to store all of or portions of the multidimensional arrays (or vectors) of input data elements and output data elements generated and/or utilized by the hardware engines 92a-92n. The input data elements may be transferred to the shared memory 94 from the DRAM circuit 86 via the memory bus 88. The output data elements may be sent from the shared memory 94 to the DRAM circuit 86 via the memory bus 88.

The path 96 may implement a transfer path internal to the processor 84. The transfer path 96 is generally operational to move data from the scheduler circuit 90 to the shared memory 94. The transfer path 96 may also be operational to move data from the shared memory 94 to the scheduler circuit 90.

The processor 82 is shown communicating with the computer vision processor 84. The processor 82 may be configured as a controller for the computer vision processor 84. In some embodiments, the processor 82 may be configured to transfer instructions to the scheduler 90. For example, the processor 82 may provide one or more directed acyclic graphs to the scheduler 90 via the DAG memory 98. The scheduler 90 may initialize and/or configure the hardware engines 92a-92n in response to parsing the directed acyclic graphs. In some embodiments, the processor 82 may receive status information from the scheduler 90. For example, the scheduler 90 may provide a status information and/or readiness of outputs from the hardware engines 92a-92n to the processor 82 to enable the processor 82 to determine one or more next instructions to execute and/or decisions to make. In some embodiments, the processor 82 may be configured to communicate with the shared memory 94 (e.g., directly or through the scheduler 90, which receives data from the shared memory 94 via the path 96). The processor 82 may be configured to retrieve information from the shared memory 94 to make decisions. The instructions performed by the processor 82 in response to information from the computer vision processor 84 may be varied according to the design criteria of a particular implementation.

The circuit 110a may implement a convolution circuit. The convolution circuit 110a may be in communication with the memory 94 to receive input data and present the output data. The convolution circuit 110a is generally operational to fetch a plurality of data vectors from the shared memory circuit 94. Each data vector may comprise a plurality of the data values. The convolution circuit 110a may also be operational to fetch a kernel from the shared memory 94. The kernel generally comprises a plurality of kernel values. The convolution circuit 110a may also be operational to fetch a block from the shared memory 94 to an internal (or local) buffer. The block generally comprises a plurality of input tiles. Each input tile may comprise a plurality of input values in multiple dimensions. The convolution circuit 110a may also be operational to calculate a plurality of intermediate values in parallel by multiplying each input tile in the internal buffer with a corresponding one of the kernel values and calculate an output tile comprising a plurality of output values based on the intermediate values. In various embodiments, the convolution circuit 110a may be implemented solely in hardware. An example of a convolution calculation scheme that may be used to implement the circuit 110a may be found in U.S. Pat. No. 10,210,768, which is herein incorporated by reference in its entirety.

The circuit 110b may implement a pooling process in accordance with embodiments of the invention. In various embodiments, a region of interest pooling scheme in accordance with embodiments of the invention may be performed according to implementation descriptions provided herein.

Figure 2:
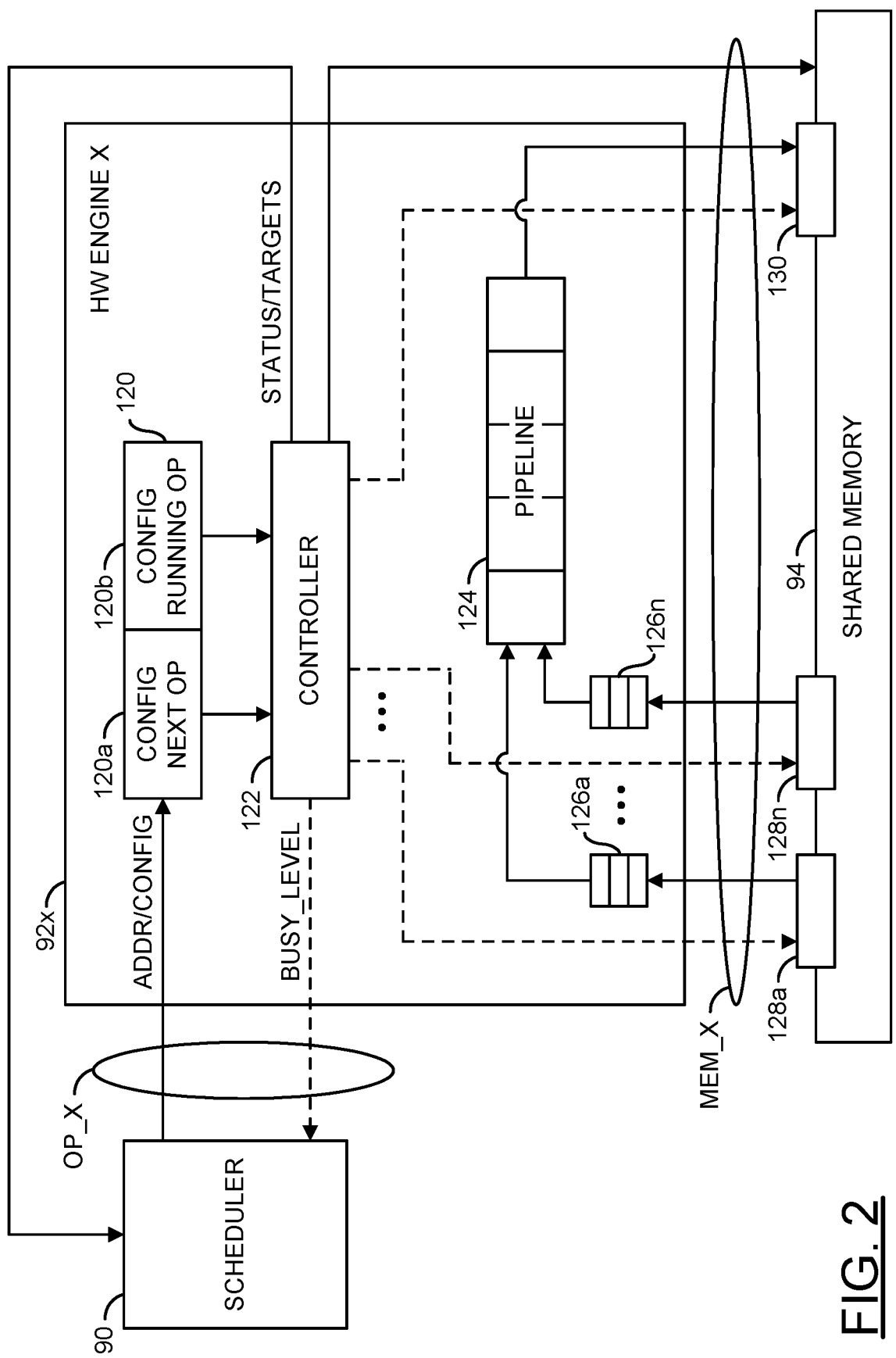
FIG. 2 is a diagram illustrating a generic implementation of a hardware engine of FIG. 1.

Referring to FIG. 2, a diagram illustrating an example implementation of a generic hardware engine 92x of FIG. 1 is shown. The hardware engine 92x may be representative of the hardware engines 92a-92n. The hardware engine 92x generally comprises a block (or circuit) 120, a block (or circuit) 122, a block (or circuit) 124, and a number of blocks (or circuits) 126a-126n. The circuit 120 may be implemented as a pair of memories (or buffers) 120a and 120b. The circuit 122 may implement a controller circuit. In an example, the circuit 122 may include one or more finite state machines (FSMs) configured to control various operators implemented by the hardware engine 92x. The circuit 124 may implement a processing pipeline of the hardware engine 92x. The circuits 126a-126n may implement first-in-first-out (FIFO) memories. The circuits 126a-126n may be configured as input buffers for the processing pipeline 124. The shared memory 94 may be configured (e.g., by signals from the circuit 122) as multiple shared input buffers 128a-128n and one or more output buffers 130.

A signal (e.g., ADDR/CONFIG) may be generated by the scheduler circuit 90 and received by the hardware engine 92x. The signal ADDR/CONFIG may carry address information and configuration data. A signal (e.g., BUSY_LEVEL) may be generated by the circuit 122 and transferred to the scheduler circuit 90. The signal BUSY_LEVEL may convey the busy level of the hardware engine 92x. A signal (e.g., STATUS/TARGETS) may be generated by the circuit 122 and transferred to the scheduler circuit 90. The signal STATUS/TARGETS may provide status information regarding the hardware engine 92x and target information for the operands.

In an example embodiment, the buffers 120a and 120b may be configured as a double-banked configuration buffer. The double-banked buffer may be operational to store configuration information for a currently running operation in one buffer (e.g., the buffer 120b) while configuration information for a next operation is being moved into the other buffer (e.g., the buffer 120a). The scheduler 90 generally loads operator configuration information, including status words in a case where the operator has been partially processed in previous operator chunks, into the double-banked buffer. Once the circuit 122 is finished with the configuration information of the running operation and the configuration information for the next operation has been received, the buffers 120a and 120b may swapped.

The circuit 122 generally implements the control circuitry of the hardware engine 92x. The circuit 122 determines when to switch from the currently running operator to the new operator. The controller 122 is generally operational to control the movement of information into, out of, and internal to the hardware engine 122x. In general, the operation of the hardware engine 92x is pipelined. During an operator switch, a front end of the pipeline 124 may already be working on data for the new operator while a tail-end of the pipeline 124 is still finishing up the processing associated with old operator.

The circuit 124 may implement a pipeline circuit. The pipeline circuit 124 is generally operational to process operands received from the shared memory 94 using functionality designed into the hardware engine 92x. The circuit 124 may communicate data resulting from the functions performed to the one or more shared buffers 130.

The buffers 126a-126n may implement FIFO buffers. The FIFO buffers 126a-126n may be operational to store operands received from the shared buffers 128a-128n for processing in the pipeline 124. In general, the number of FIFO buffers and the number of shared buffers implemented may be varied to meet the design criteria of a particular application.

Figure 3:
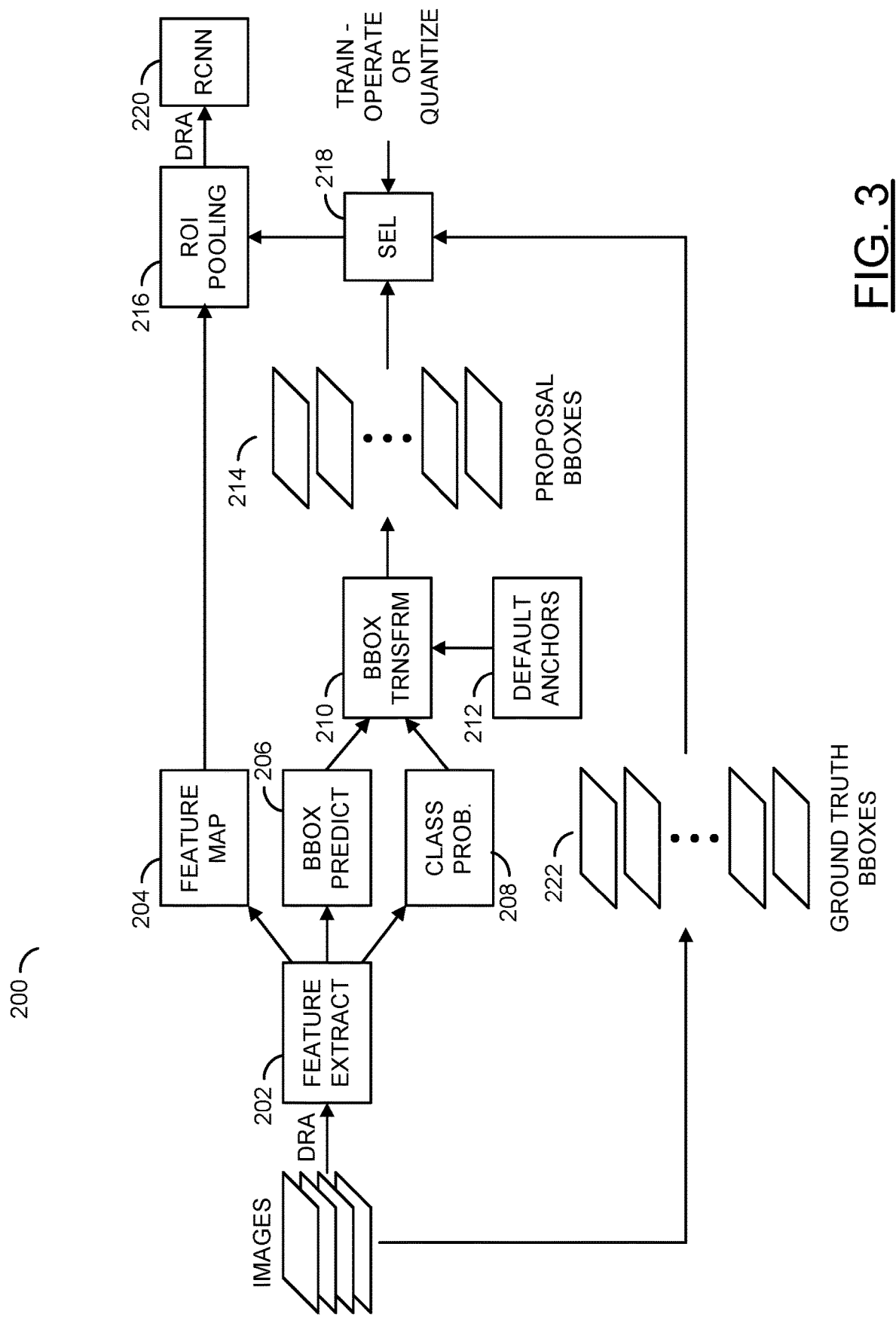
FIG. 3 is a diagram illustrating a multi-stage object detection process in accordance with an example embodiment of the invention.

Referring to FIG. 3, a diagram is shown illustrating a multi-stage object detection process in accordance with an example embodiment of the invention. In an example embodiment, a process (or method) 200 generally implements a multi-stage object detection process in accordance with an example embodiment of the invention. In an example embodiment, the process 200 may comprise a step (or state) 202, a step (or state) 204, a step (or state) 206, a step (or state) 208, a step (or state) 210, a step (or state) 212, a step (or state) 214, a step (or state) 216, a step (or state) 218, a step (or state) 220, and a step (or state) 222. In the step 202, the process 200 may perform a feature extraction process on image data of one or more input images (IMAGES) using a region proposal network. During a training phase and an inference phase application of the process 200, the feature extraction process may be applied directly to the image data of the input image(s). During a quantization phase application of the process 200, the feature extraction process may be performed on quantized image data of the input image(s). In various embodiments, the quantized image data of the input image(s) may be obtained by applying a first data range analysis (DRA) to the image data of the input image(s).

In the step 204, the process 200 may generate a feature map based on results from the step 202. In the step 206, the process 200 may predict a number of bounding boxes based on results from the step 202. In the step 208, the process 200 may predict a corresponding class probability for each of the number of bounding boxes based on results from the step 202. In the step 210, a number of proposal bounding boxes 214 may be generated by applying a bounding box transform function (e.g., bbox_transform_inv) using the number of bounding boxes generated in the step 206, the class probabilities generated in the step 208, and a number of default anchors 212 as inputs.

In the step 216, a region of interest (ROI) pooling operation may be performed. The ROI pooling operation of the step 216 is generally performed using the feature map generated in the step 204 as one input and a second input selected in the step 218. In the step 218, the second input to the ROI Pooling step 216 is generally selected based on whether the process 200 is being performed during the training phase, the quantization phase, or the inference (operate) phase. In the training and inference phases, the step 218 generally selects the proposal bboxes 214 as the second input to the ROI Pooling step 216 and an output of the ROI Pooling step 216 is presented directly as an input to the step 220. In the quantization phase, the step 218 generally selects ground truth bboxes 222 as the second input to the ROI Pooling step 216 and a second data range analysis (DRA) is performed on the output of the ROI Pooling step 216 before being presented as the input to the step 220.

In the step 220, the process 200 may apply a region-based convolutional neural network (RCNN) model to the output of the ROI Pooling step 216 to identify whether one or more predetermined object classes are in the input image, and if so, how many instances are present. In some embodiments, the step 220 may provide (generate) two outputs, including the location of the bounding boxes and the probability of each of the one or more classes.

Because the proposal bboxes 214 come from the RPN, the proposal bboxes 214 generally have a shift relative to the ground truth bboxes 222. However, the shift is generally not an issue because the RCNN model applied during the step 220 generally does fine-tuning on the location as well. In an example, the ground truth boxes 222 may be taken from the annotation in some datasets, such as VOC, COCO, etc. The annotation is generally marked by a person or organization. In an example pipeline, the ground truth from the corresponding annotation could be read.

During the quantization phase, the ROI pooling operation 216 generates a number of quantized proposal bounding boxes by applying the second data range analysis (DRA) using the number of ground truth boxes 222 selected in the step 218. Using the ground truth bboxes 222 generally improves the accuracy of the quantization data distribution from the ROI Pooling step 216. The first and second data range analyses are generally implemented with the same algorithm. The difference is that the first data range analysis deals with the input image data and the second data range analysis deals with the output of the ROI Pooling step 216. In general, a conventional or proprietary data range analysis algorithm may used for the first and second data range analyses in the quantization phase.

In various embodiments, the process 200 may be used during each of the steps or stages or phases of a normal artificial neural network development flow; train→quantization→deploy(inference real-time). During training, the ROI pooling of the process 200 generally uses the traditional method, taking a feature map and proposal bboxes generated by the region proposal network (RPN). When training is completed, a quantization process may be performed. Quantization is generally performed to determine the best coefficients according to the input data range, so that fixed-point values may be used to replace floating-point values more accurately. During quantization, the ROI pooling of the process 200 switches to a the new method of using the feature map generated by the region proposal network (RPN) and ground truth bounding boxes, and applying data range analysis to the ROI pooling results prior to presentation to the region-based convolutional neural network (RCNN) model.

In the quantization phase, as many test scene pictures as possible are generally provided for data range analysis. The pictures of the training set may also be used here for quantization for fixed-point applications. During quantization in accordance with embodiments of the invention, the ROI pooling of the process 200 is performed by taking the feature map generated by the region proposal network (RPN) and ground truth bounding boxes instead of the proposal bboxes generated by the region proposal network (RPN). In an example, the ground truth boxes may be taken from the annotation in some datasets, such as VOC, COCO, etc. The annotation is generally marked by a person or organization. In an example pipeline, the ground truth from the corresponding annotation could be read.

When quantization is complete, the network is ready to be deployed (e.g, inference operation). During inference operation, ROI pooling of the process 200 generally returns to the traditional method, using the feature map and the proposal bboxes generated by the region proposal network (RPN). In various embodiments, the RPN and the RCNN may share one or more convolution layers.

Figure 4:
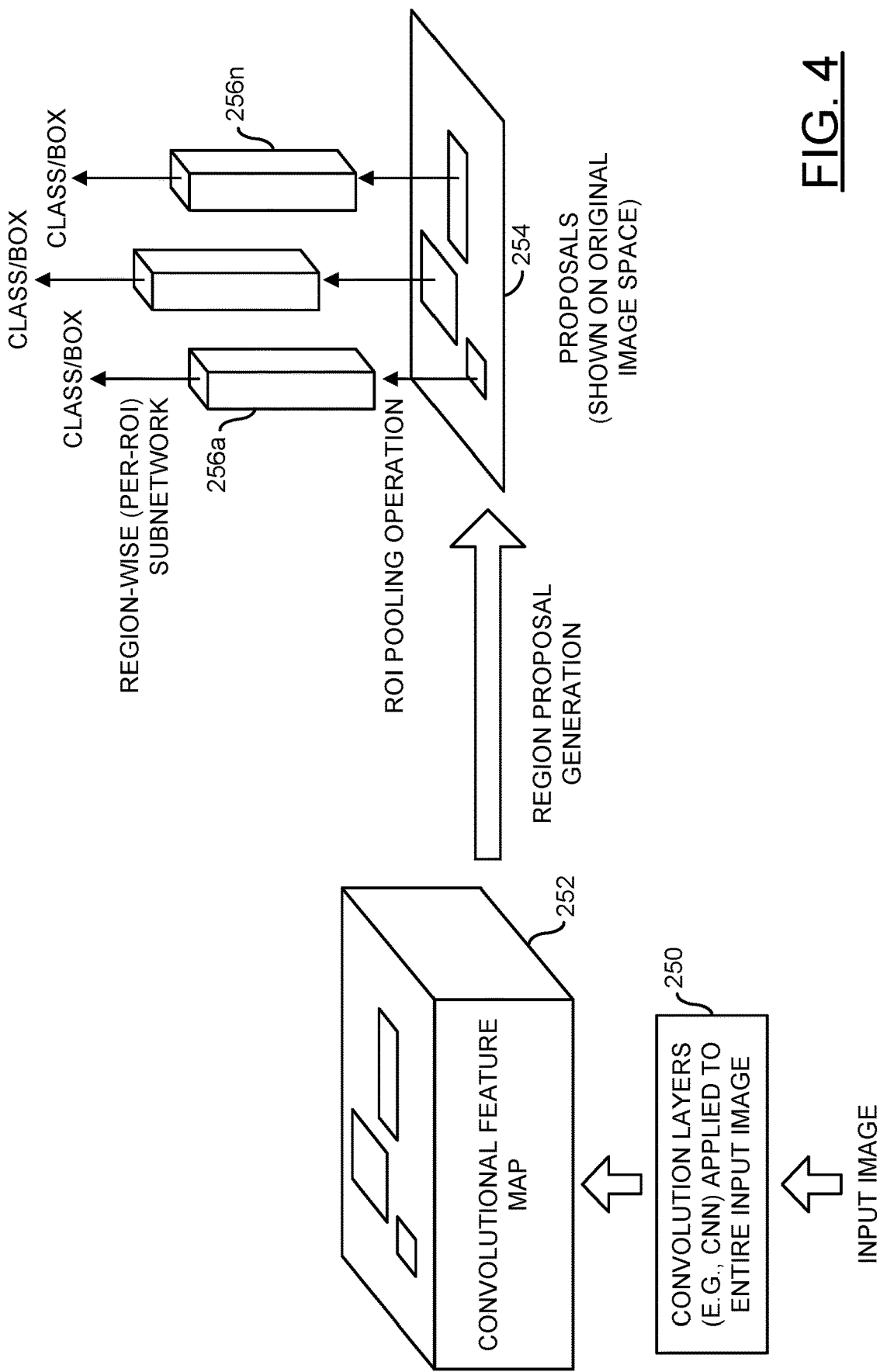
FIG. 4 is a diagram illustrating an example region of interest (ROI) pooling operation in accordance with an example embodiment of the invention with a context of object detection with a convolutional neural network (CNN).

Referring to FIG. 4, a diagram is shown illustrating an example region of interest (ROI) pooling operation in accordance with an example embodiment of the invention implemented in a context of object detection with a convolutional neural network (CNN). In various embodiments, a whole input image is generally forwarded through several convolution layers 250 to generate a convolutional feature map 252. In an example, the feature map generally is of size C×H×W, where C, H, and W denote the depth (e.g., number of channels), height, and width of the feature map.

The convolutional feature map 252 may be used as input to a region proposal generator. In various embodiments, the region proposal generator may be an external proposal method or internal sub-network. The region proposal generator may be implemented using conventional and/or proprietary techniques. The region proposal generator is generally configured to output a set of proposals of objects (e.g., regions of interest) within the input image (e.g., illustrated on the original image space 254). The proposals/ROIs may be of non-uniform sizes. In various embodiments, the proposals/ROIs received from the region proposal generator are generally projected onto the input image 254 based on predetermined criteria to obtain ground truth regions of interest. A ROI pooling operation in accordance with an embodiment of the invention is performed on each ground truth proposal/ROI to produce fixed-size feature maps 256a-256n for each region proposal. Each of the fixed-size feature maps 256a-256n are generally fed to a subsequent per-proposal (per-ROI) sub-network (e.g. a region-based convolutional neural network, or R-CNN) or process for object classification (e.g. car, pedestrian, or cyclist) and bounding box regression/refinement. An example of a region-based convolutional network method may be found in R. Girschick, "Fast R-CNN," in IEEE International Conference on Computer Vision (ICCV), 2015, which is herein incorporated by reference in its entirety. In an example, the result of the region of interest pooling may be used to classify objects in the input image.

Figure 5:
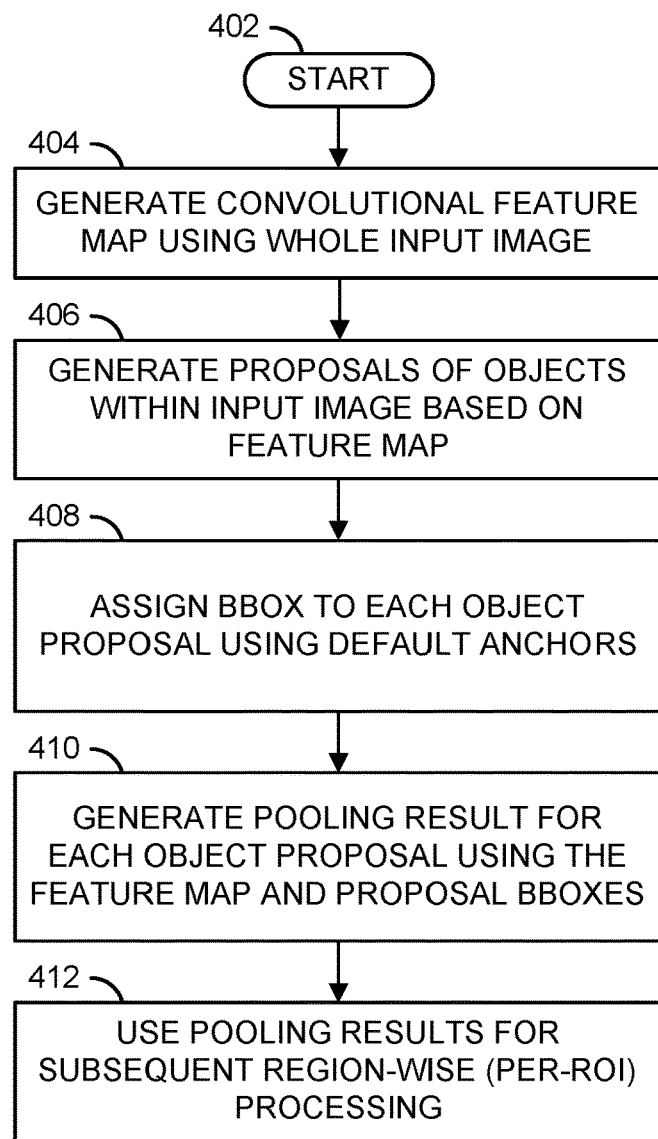
FIG. 5 is a diagram illustrating a process during a training or inference phase in accordance with an example embodiment of the invention.

Referring to FIG. 5, a flow diagram of a process 400 is shown illustrating a process during a training or inference phase in accordance with an example embodiment of the invention. The process (or method) 400 generally implements a region of interest (ROI) pooling scheme in accordance with an example embodiment of the invention. In an example embodiment, the process 400 may comprise a step (or state) 402, a step (or state) 404, a step (or state) 406, a step (or state) 408, a step (or state) 410, and a step (or state) 412. In an example embodiment, the steps 402-412 may implement an object detection scheme utilizing an ROI pooling technique in accordance with an example embodiment of the invention (e.g., using ground truth inputs as part of a second stage data range analysis during quantization in an object detection process).

The process 400 generally begins in the step 402 and moves to the step 404. In the step 404, the process 400 may generate a convolutional feature map using the whole input image. In an example, the whole input image may be forwarded through several convolution layers to generate a convolutional feature map of size C×H×W, where C, H, and W denote the depth (e.g., number of channels, etc.), height, and width of the feature map. The process 400 then moves to the step 406.

In the step 406, the process 400 may generate proposals of objects within the input image based on the convolutional feature map. In an example embodiment, a region proposal generator, which could be an external proposal method or an internal sub-network, may be used to generate a set of proposals/ROIs of objects within the input image. In general, the proposals/ROIs may be of non-uniform sizes. The process 400 then moves to the step 408.

In the step 408, the process 400 assigns a bounding box (BBOX) to each of the object proposals/ROIs using default anchors. In various embodiments, the assignment may be made based on predetermined criteria. The process 400 then moves to the step 410. In the step 410, the process 400 may generate pooling results for each object proposal using the feature map and of the bounding box proposals generated in the step 408. In an example embodiment, the process 400 may generate the pooling results by cropping and resampling (resizing) the corresponding bounding box. In some embodiments, resampling may be performed by a warping tool. In an example, bilinear interpolation may be used as a warping tool to generate the per-ROI feature map of the target size. However, other warping tools (e.g., nearest neighbor interpolation, bicubic interpolation, etc.) may be used to generate the per-ROI features map of the target size.

In an example, the mapped region may be programmed by software to bilinear interpolation hardware, which resizes features of the region and then the result may be passed as input to subsequent sub-networks on hardware. In a case when the ROI projects to a region smaller than the target size (e.g., 7×7) in the ground truth space, the original image data may be used and bilinear interpolation applied to up-sample features of the region.

The process 400 then moves to the step 412. In the step 412, the pooling results may be used for subsequent processing (e.g., as detected objects). In an example, each fixed-size feature map may be fed to a subsequent per-proposal sub-network (e.g. RCNN) or process for object classification (e.g. car, pedestrian, cyclist, etc.) and bounding box regression/refinement.

Figure 6:
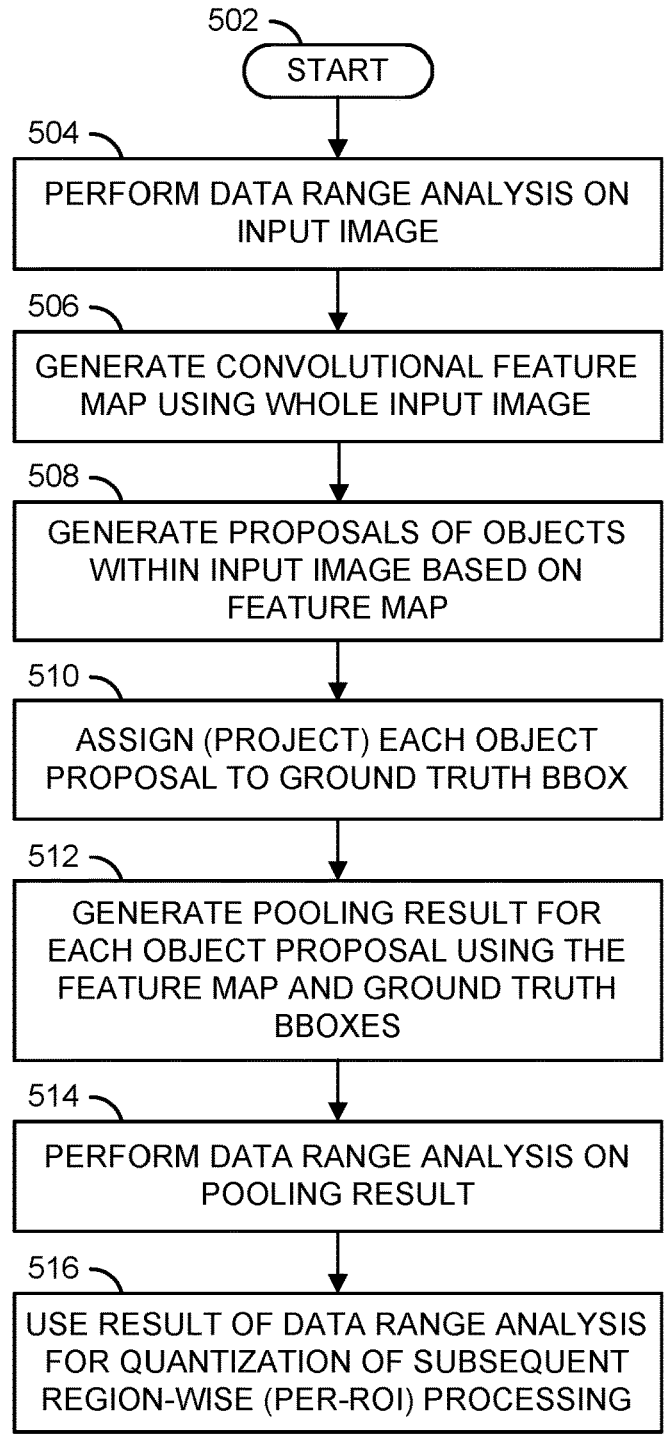
FIG. 6 is a diagram illustrating a process during a quantization phase in accordance with an example embodiment of the invention.

Referring to FIG. 6, a flow diagram of a process 500 is shown illustrating a process during a quantization phase in accordance with an example embodiment of the invention. The process (or method) 500 generally implements quantization phase of a region of interest (ROI) pooling scheme in accordance with an example embodiment of the invention. In an example embodiment, the process 500 may comprise a step (or state) 502, a step (or state) 504, a step (or state) 506, a step (or state) 508, a step (or state) 510, a step (or state) 512, a step (or state) 514, and a step (or state) 516. In an example embodiment, the steps 502-516 may implement an object detection scheme utilizing an ROI pooling technique in accordance with an example embodiment of the invention (e.g., using ground truth inputs as part of a second stage data range analysis during quantization in an object detection process).

The process 500 generally begins in the step 502 and moves to the step 504. In the step 504, the process 500 may perform a data range analysis for quantizing the input image data. The process 500 then moves to the step 506. In the step 506, the process 500 may generate a convolutional feature map using the whole input image. In an example, the whole image may be forwarded through several convolution layers to generate a convolutional feature map of size C×H×W, where C, H, and W denote the depth (e.g., number of channels, etc.), height, and width of the feature map. The process 500 then moves to the step 508.

In the step 508, the process 500 may generate proposals of objects within the input image based on the convolutional feature map. In an example embodiment, a region proposal generator, which could be an external proposal method or an internal sub-network, may be used to generate a set of proposals/ROIs of objects within the input image. In general, the proposals/ROIs may be of non-uniform sizes. The process 500 then moves to the step 510.

In the step 510, the process 500 assigns each of the proposals/ROIs to a corresponding object ground truth bounding box. In various embodiments, the assignment may be made based on predetermined criteria. In an example, the ground truth bounding boxes may be taken from the annotation in a dataset, such as VOC, COCO, etc. The annotation is generally marked by a person or organization. In an example pipeline, the ground truth from the corresponding annotation may be read. The process 500 then moves to the step 512.

In the step 512, the process 500 may generate pooling results for each object proposal using the feature map and the ground truth bounding boxes instead of the bounding box proposals generated from the region proposal network. In an example embodiment, the process 500 may generate the pooling results by cropping and resampling (resizing) the corresponding ground truth bounding box. In some embodiments, resampling may be performed by a warping tool. In an example, bilinear interpolation may be used as a warping tool to generate the per-ROI feature map of the target size. However, other warping tools (e.g., nearest neighbor interpolation, bicubic interpolation, etc.) may be used to generate the per-ROI features map of the target size.

In an example, the mapped region may be programmed by software to bilinear interpolation hardware, which resizes features of the region and then the result may be passed as input to subsequent sub-networks on hardware. In a case when the ROI projects to a region smaller than the target size (e.g., 7×7) in the ground truth space, the original image data may be used and bilinear interpolation applied to up-sample features of the region.

The process 500 then moves to the step 514, where a second data range analysis is performed on the pooling results. The process 500 then moves to the step 516. In the step 516, the pooling results may be used for subsequent processing (e.g., as detected objects). In an example, each fixed-size feature map may be fed to a subsequent per-proposal sub-network (e.g. RCNN) or process for object classification (e.g. car, pedestrian, cyclist, etc.) and bounding box regression/refinement.

Figure 7:
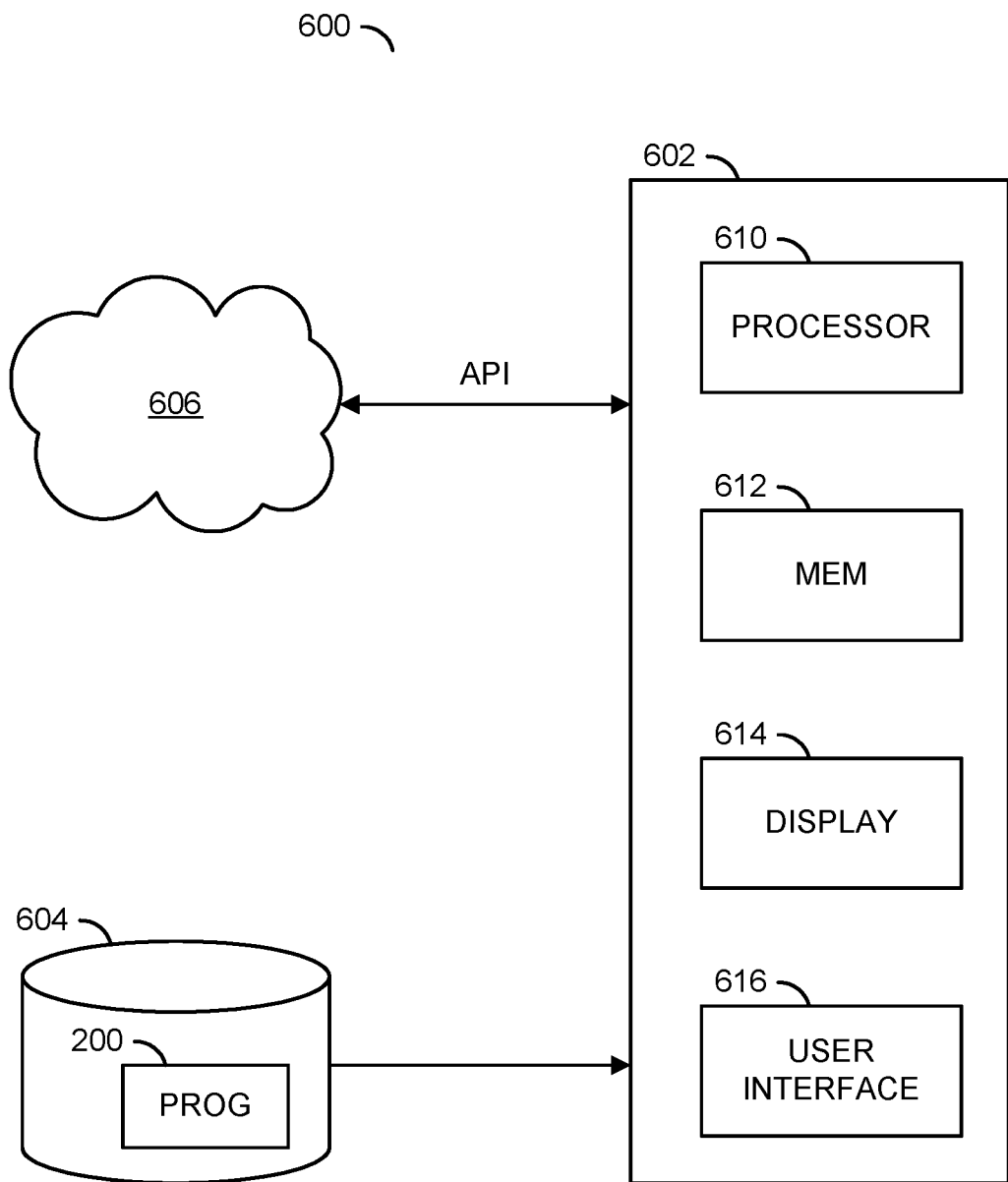
FIG. 7 is a diagram illustrating an example of a computer system in which the process of FIG. 3 may be implemented.

Referring to FIG. 7, a diagram is shown illustrating a context in which training and quantization phases of the process 200 of FIG. 3 may be implemented. In an example, a system 600 may be configured (e.g., through software) to perform the process 200 on a previously generated neural network. In an example, the system 600 may comprise a computer 602 and a computer readable storage medium 604. In an example, the computer 602 may be implemented as a general purpose computer system. In an example, the computer readable storage medium 604 may comprise non-volatile media including, but not limited to, a magnetic storage medium (e.g., a hard disk drive or HDD), an optical storage medium (e.g., compact disc (CD), digital video disc (DVD), BluRay disc (BD), a solid state drive (SSD), Flash memory, and/or a network associated storage system (NAS). In an example, the computer 602 and the computer readable storage medium 604 may be coupled together to exchange programs and data. In an example, a program (or programs) implementing the process 200 may be stored on the computer readable storage medium 604 or in cloud based resources 606. In an example, the computer 602 may be further configured to perform the process 200 utilizing the cloud resources 606. In an example, the computer 602 may be configured to perform the process 200 via an application program interface (API).

In an example, the computer 602 may include, but is not limited to, a processor 610, memory 612, a display 614, and a user interface 616. In various embodiments, the processor 610 may include, but is not limited to, a central processing unit (CPU), a graphics processing unit (GPU), and a video processing unit (VPU). In various embodiments, the memory 612 may include, but is not limited to, random access memory (e.g., SRAM, DRAM, FLASH, etc.), read only memory (ROM), and cache memory. The display 614 and the user interface 616 generally allow a user to initiate and monitor the computer 602 performing the process 200 during the training and quantization phases.

Figure 8:
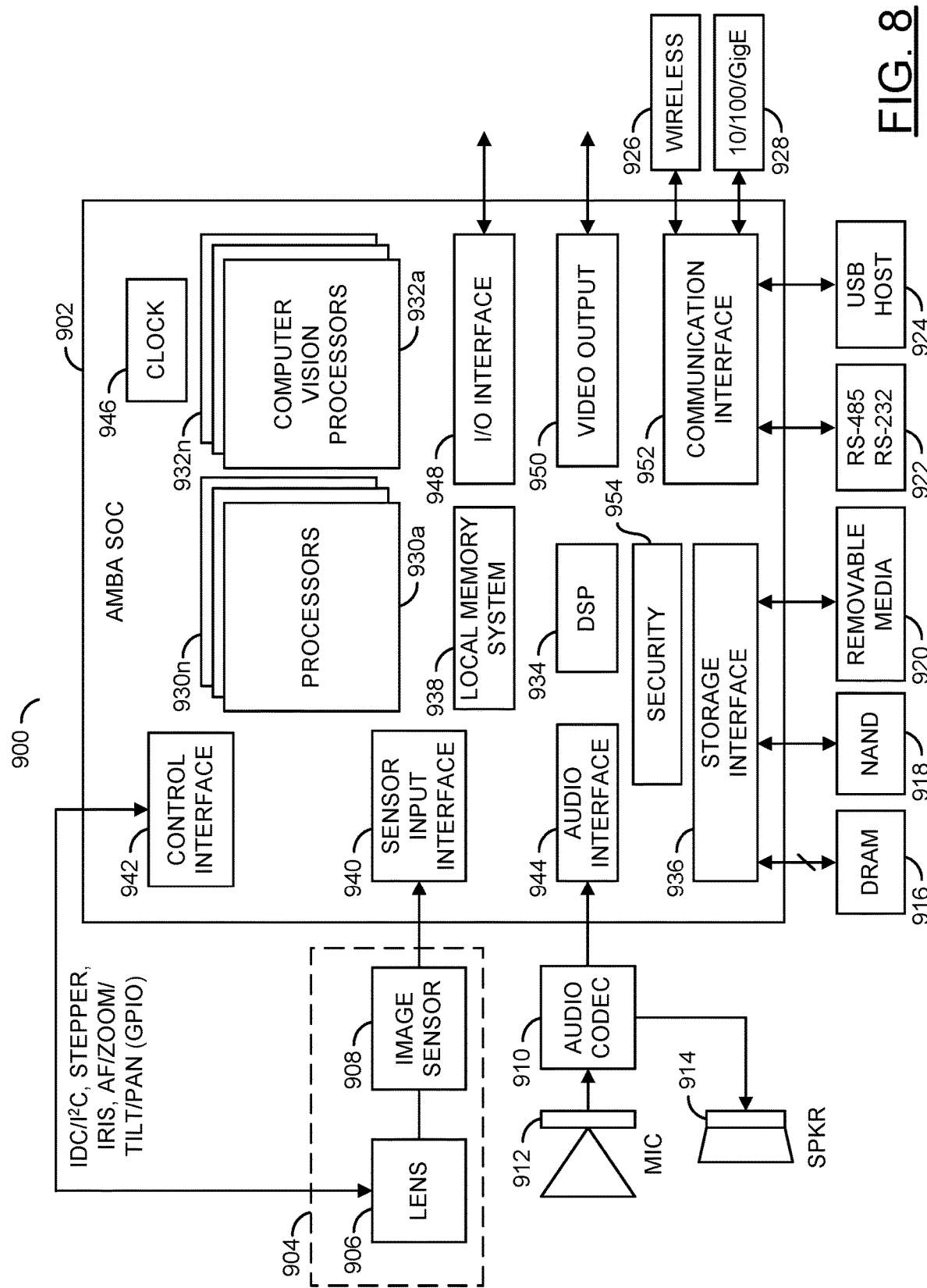
FIG. 8 is a diagram illustrating a camera system illustrating an example implementation of a computer vision system in which a quantized multi-stage object detection network in accordance with example embodiments of the invention may be utilized.

Referring to FIG. 8, a diagram of a camera system 900 is shown illustrating an example implementation of a computer vision system in which a quantized multi-stage object detection process in accordance with example embodiments of the invention may be implemented and/or deployed. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the circuits and processes described above in connection with FIG. 1 through FIG. 5.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be implemented as one or more image sensors. In one example, the circuit 908 may be implemented as an RGB sensor and/or an IR sensor. In another example, the circuit 908 may be implemented as and RGB-IR sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera system 900. The lens assembly 906 may capture and/or focus light for the image sensor(s) 908. The lens assembly 906 may implement an optical lens or lenses. The lens assembly 906 may provide a zooming feature and/or a focusing feature.

The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera system 900.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. The image sensor 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930a-930n, a number of blocks (or circuits) 932a-932n, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, a block (or circuit) 952, and/or a block (or circuit) 954. The number of circuits 930a-930n may be processor circuits. In various embodiments, the circuits 930a-930n may include one or more embedded processors (e.g., ARM, etc.). The circuits 932a-932n may implement a number of computer vision related processor circuits. In an example, one or more of the circuits 932a-932n may implement various computer vision related applications. The circuit 934 may be a digital signal processing (DSP) module. In some embodiments, the circuit 934 may implement separate image DSP and video DSP modules.

The circuit 936 may be a storage interface. The circuit 936 may interface the processor/camera circuit 902 with the DRAM 916, the non-volatile memory 918, and the removable media 920. One or more of the DRAM 916, the non-volatile memory 918 and/or the removable media 920 may store computer readable instructions. The computer readable instructions may be read and executed by the processors 930a-930n. In response to the computer readable instructions, the processors 930a-930n may be operational to operate as controllers for the processors 932a-932n. For example, the resources of the processors 932a-932n may be configured to efficiently perform various specific operations in hardware and the processors 930a-930n may be configured to make decisions about how to handle input/output to/from the various resources of the processors 932.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. In an example, the DAG memory 98 may be implemented in the local memory system 938. The circuit 940 may implement a sensor input (or interface). The circuit 942 may implement one or more control interfaces including but not limited to an inter device communication (IDC) interface, an inter integrated circuit (I2C) interface, a serial peripheral interface (SPI), and a pulse width modulation (PWM) interface. The circuit 944 may implement an audio interface (e.g., an I2S interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuit 954 may be a security module. The circuits 930 through 954 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDRC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the processors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I2S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee®, Z-Wave, LoRa, Institute of Electrical and Electronics Engineering (IEEE) 802.11a/b/g/n/ac (WiFi), IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, 5G, LTE_M, NB-IoT, SMS, etc. The communication module 952 may also include support for communication using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The security module 954 may include a suite of advanced security features to implement advanced on-device physical security, including OTP, secure boot, TrustZone®, and I/O visualization, and DRAM scrambling. In an example, the security module 958 may include a true random number generator. In an example, the security module 954 may be used for DRAM communication encryption on the processor/camera circuit 902.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee®, Z-Wave, LoRa, Wi-Fi IEEE 802.11a/b/g/n/ac, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, 5G, SMS, LTE_M, NB-IoT, etc. The processor/camera circuit 902 may also include support for communication using one or more of the universal serial bus protocols (e.g., USB 1.0, 2.0, 3.0, etc.).

The functions and structures illustrated in the diagrams of FIGS. 1 to 8 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a memory configured to store image data of an input image; and
a processor configured to detect one or more objects in said input image using a quantized multi-stage object detection network, wherein quantization of said quantized multi-stage object detection network comprises (i) generating quantized image data by performing a first data range analysis on said image data of said input image, (ii) generating a feature map and proposal bounding boxes by applying a region proposal network (RPN) to said quantized image data, (iii) selecting a plurality of ground truth bounding boxes from said input image, (iv) performing a region of interest pooling operation using said feature map and said plurality of ground truth bounding boxes of said input image instead of the proposal bounding boxes generated by the RPN, (v) generating quantized region of interest pooling results by performing a second data range analysis on results from said region of interest pooling operation performed using said feature map and said plurality of ground truth bounding boxes of said input image, and (vi) applying a region-based convolutional neural network (RCNN) to the quantized region of interest pooling results.

2. The apparatus according to claim 1, wherein said ground truth bounding boxes are projections of said proposal bounding boxes on said input image.

3. The apparatus according to claim 1, wherein said second data range analysis applies a technique applied by said first data range analysis.

4. The apparatus according to claim 1, wherein training of said RPN and said RCNN comprises (i) generating a feature map and proposal bounding boxes by applying said RPN to said image data of said input image and (ii) performing said region of interest pooling operation on said feature map and said proposal bounding boxes generated by the RPN.

5. The apparatus according to claim 1, wherein the RPN and the RCNN are stored in said processor as directed acyclic graphs and corresponding weights.

6. The apparatus according to claim 1, wherein the RPN and the RCNN share one or more convolution layers.

7. The apparatus according to claim 1, wherein said processor is further configured to generate a pooling result for a region of interest by cropping and resampling a corresponding portion of a feature map to which an object detection proposal is assigned.

8. The apparatus according to claim 7, wherein said resampling comprises a warping operation.

9. The apparatus according to claim 1, wherein said processor configures bilinear interpolation hardware to resize features of a region of interest for use as an input to subsequent sub-networks on hardware.

10. The apparatus according to claim 1, wherein said feature map comprises a three-dimensional array having dimensions corresponding to a depth, a height, and a width of said feature map.

11. The apparatus according to claim 1, wherein said memory and said processor are part of at least one of a computer vision system or an autonomous vehicle.

12. A method of object detection comprising:
storing image data of an input image in a memory; and
detecting one or more objects in said input image using a processor to execute a quantized multi-stage object detection network, wherein quantization of said quantized multi-stage object detection network is performed by (i) generating quantized image data by performing a first data range analysis on said image data of said input image, (ii) generating a feature map and proposal bounding boxes by applying a region proposal network (RPN) to said quantized image data, (iii) selecting a plurality of ground truth bounding boxes from said input image, (iv) performing a region of interest pooling operation using said feature map and said plurality of ground truth bounding boxes of said input image instead of the proposal bounding boxes generated by the RPN, (v) generating quantized region of interest pooling results by performing a second data range analysis on results from said region of interest pooling operation performed using said feature map and said plurality of ground truth bounding boxes of said input image, and (vi) applying a region-based convolutional neural network (RCNN) to the quantized region of interest pooling results.

13. The method according to claim 12, wherein said ground truth bounding boxes are projections of said proposal bounding boxes on said input image.

14. The method according to claim 12, further comprising training said RPN and said RCNN, wherein training of said RPN and said RCNN comprises (i) generating a feature map and proposal bounding boxes by applying said RPN to said image data of said input image and (ii) performing said region of interest pooling operation on said feature map and said proposal bounding boxes generated by the RPN.

15. The method according to claim 12, wherein the RPN and the RCNN are stored in said processor as directed acyclic graphs and corresponding weights.

16. The method according to claim 12, wherein the RPN and the RCNN share one or more convolution layers.

17. The method according to claim 12, further comprising:
generating a pooling result for a region of interest by using said processor to perform cropping and resampling of a corresponding portion of a feature map to which an object detection proposal is assigned.

18. The method according to claim 17, wherein resampling comprises applying a warping operation.

19. The method according to claim 12, further comprising using said processor to configure bilinear interpolation hardware to resize features of the region of interest for use as an input to subsequent sub-networks on hardware.

20. The method according to claim 12, wherein said feature map comprises a three-dimensional array having dimensions corresponding to a depth, a height, and a width of said feature map.

* * * * *